United States Patent [19]

Hubscher

[11] Patent Number: 5,095,591
[45] Date of Patent: Mar. 17, 1992

[54] SECURING DEVICE

[76] Inventor: Maurice A. Hubscher, P.O. Box 29, Rt. 202 North, Flemington, N.J. 08822

[21] Appl. No.: 591,996

[22] Filed: Oct. 1, 1990

[51] Int. Cl.[5] ............................................. A44B 21/00
[52] U.S. Cl. ........................................ 24/72.5; 24/461; 160/395; 5/498
[58] Field of Search ................. 24/72.5, 460, 461, 462; 5/496, 498, 508; 160/392, 393, 394, 395, 396

[56] References Cited

U.S. PATENT DOCUMENTS

| | | | |
|---|---|---|---|
| 286,027 | 10/1883 | Lobdell | 160/392 |
| 684,674 | 10/1901 | Clark | 24/461 |
| 737,062 | 8/1903 | Bennett | 24/462 |
| 764,984 | 7/1904 | Booth | 24/461 |
| 2,089,221 | 8/1937 | Patur et al. | 24/460 |
| 2,526,376 | 10/1950 | London | 24/462 |
| 3,036,354 | 5/1962 | DeBie | 24/462 |
| 3,257,499 | 6/1966 | Broske | 24/460 |
| 3,524,491 | 8/1970 | Olson | 160/395 |
| 4,393,915 | 7/1983 | Olson | 160/395 |
| 4,698,880 | 10/1987 | Hamm | 24/72.5 |

FOREIGN PATENT DOCUMENTS

| | | | |
|---|---|---|---|
| 0561818 | 5/1960 | Belgium | 24/460 |
| 1456013 | 10/1966 | France | 24/460 |
| 1165725 | 10/1969 | United Kingdom | 160/395 |

*Primary Examiner*—Victor N. Sakran
*Attorney, Agent, or Firm*—Lowe, Price, LeBlanc & Becker

[57] ABSTRACT

A gripping device for securing a covering to an upholstered bead is described. The device is a rigid elongated member having a longitudinal hollowed out portion with an internal constriction so that when the bead and covering are received therein the construction will wedge the same against the internal walls of said device.

9 Claims, 4 Drawing Sheets

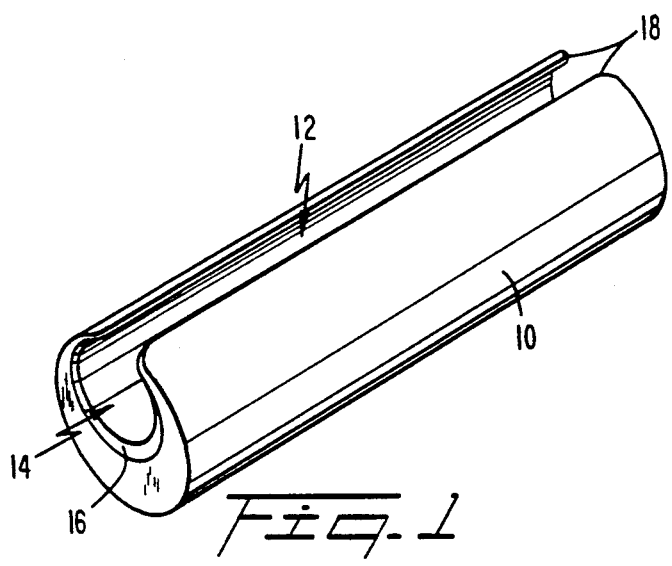
Fig. 1
PRIOR ART
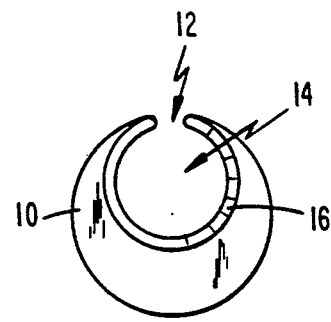
Fig. 1A
PRIOR ART
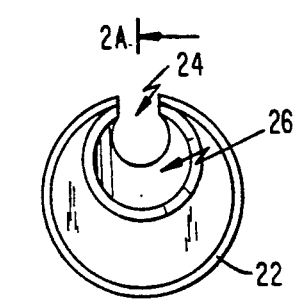
Fig. 2
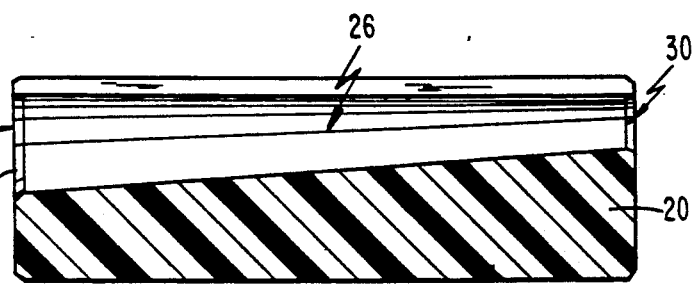
Fig. 2A
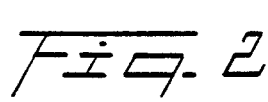
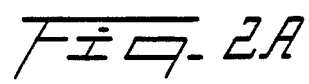
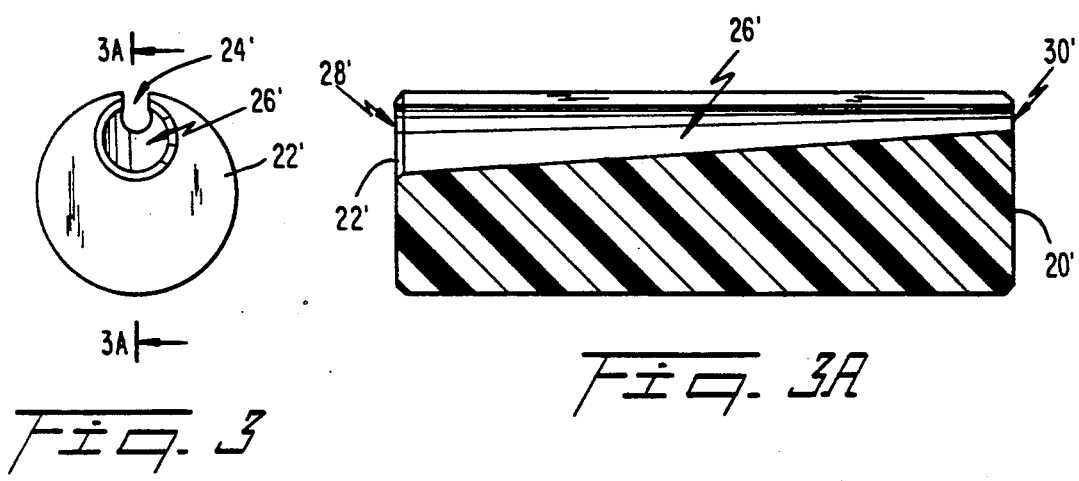
Fig. 3
Fig. 3A

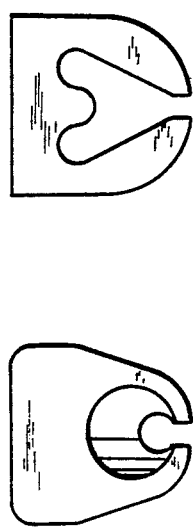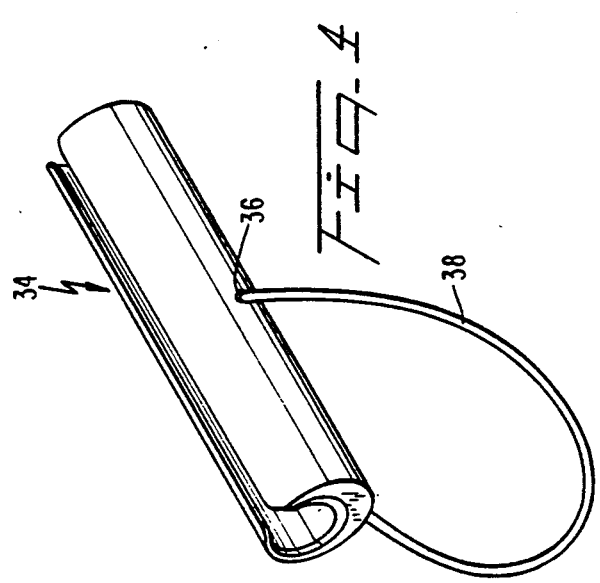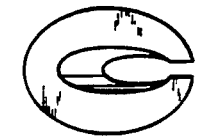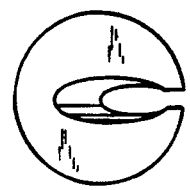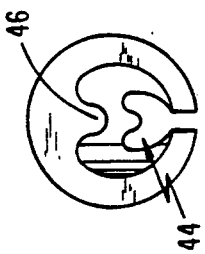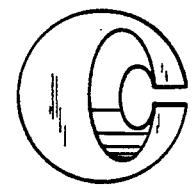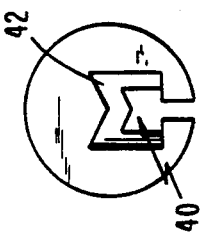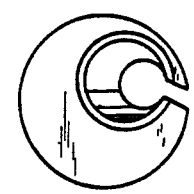

SECURING DEVICE

This invention relates to a static device for gripping and holding a loose cover member or sheet to the bead of an upholstered member such as a mattress, couch, or chair. The device also could function to grip clothing or bedding members on a clothes line.

In addition to the obvious use of such a device in the home as a means for keeping the bottom sheet or other bed coverings snug against the mattress, such a device could function to hold for example a slipcover, onto an upholstered article of furniture by functioning in the same manner. In addition, the device is particularly suitable for hospitals, nursing homes and the like wherein the patient is bedridden.

It is known to provide a elongated member having a cylindrical notch removed along the length thereof. The member then functions to receive, for example, both the bead from a mattress and that portion of the sheet which extends thereover. This device then, made of rigid plastic or similar material, is intended to secure unfitted sheets to mattresses, or fitted sheets wherein the elastic has worn out so that the sheet will remain snug over the mattress.

This prior art device with a notch of uniform thickness incorporates a disadvantage. In order to fit over the bead and covering material the notch must be very close in width to the diameter of the bead. Therefore, once the bead is received within the notch, the securing device can be dislodged by pressure perpendicular to the longitudinal axis of the device. In addition, the device of the prior art is free to move laterally along the bead so that, while not dislodging from the bead itself, it could be moved to a place along the mattress which would permit a portion of the sheet to be loose.

Accordingly, there is a need for a static gripping member which can be easily secured to a bead and overlying material and which will grip the same so that it cannot be dislodged by applied force perpendicular thereto. In the several embodiments of this invention which will be hereinafter described, the gripping member is rigid and, also has an elongated notch extending the entire length thereof. However, the device of this invention provides a constriction within the notch, preferably at one end thereof so that as the gripping member slides onto the bead the bead will be forced into the constriction. The member then grips the bead. The gripping member then can only be dislodged by lateral movement in the opposite direction whereby the bead moves out of the constriction.

Accordingly it is an object of this invention to provide a device for gripping a beaded seam to secure a covering thereto which will grip the seam against a dislodging force perpendicular to the longitudinal axis.

It is another object of this invention to provide an elongated, hollow static gripping member for gripping a bead on a mattress whereby a sheet may be gripped and secured by the device which will ensure that the sheet or other bed covering will remain taut or snug.

It is yet another object of this invention to provide an elongated rigid gripping member for a beaded seam which has a longitudinal notch extending the length thereof and which further includes an internal constriction or taper whereby as the bead and covering enter the notch and encounter the taper they will be wedged therein.

These and other objects will become readily apparent with reference to the drawings and following description wherein:

FIG. 1 is a perspective view of a prior art griping member.

FIG. 1A is an end view of the device of FIG. 1.

FIG. 2 is an end view of an embodiment of the gripping member of this invention.

FIG. 2A is a cross-sectional view taken along lines 2-A of FIG. 2.

FIG. 3 is a view similar to FIG. 2 showing an end view of an alternative embodiment of this invention.

FIG. 3A is a cross-sectional view taken along lines 3-A of FIG. 3.

FIG. 4 is perspective view of an alternative embodiment of this invention.

FIG. 5A and B are composite cross-sectional views taken perpendicular to the longitudinal axis of alternate embodiments of this invention.

FIG. 6A–F also are composite cross-sectional views of alternate embodiments of this invention taken perpendicular to the longitudinal, axis.

Figure 7:
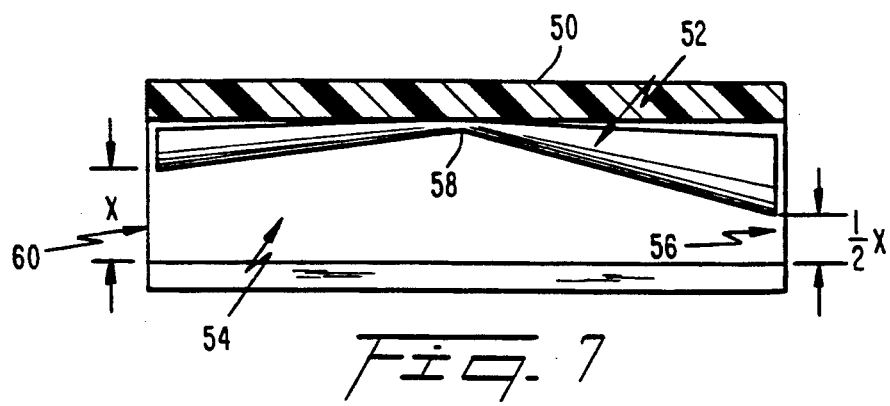

FIG. 7 is a longitudinal cross-sectional view of yet another embodiment of this invention.

Figures 8, 8A:
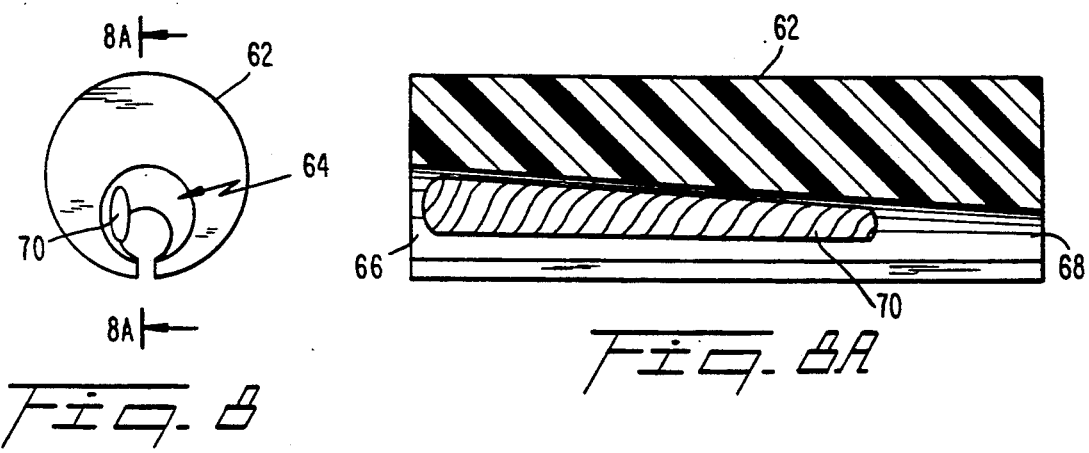

FIG. 8 is an end view of still another embodiment of this invention.

FIG. 8A is a cross-sectional view taken along lines 8-A of FIG. 8.

Figure 9:
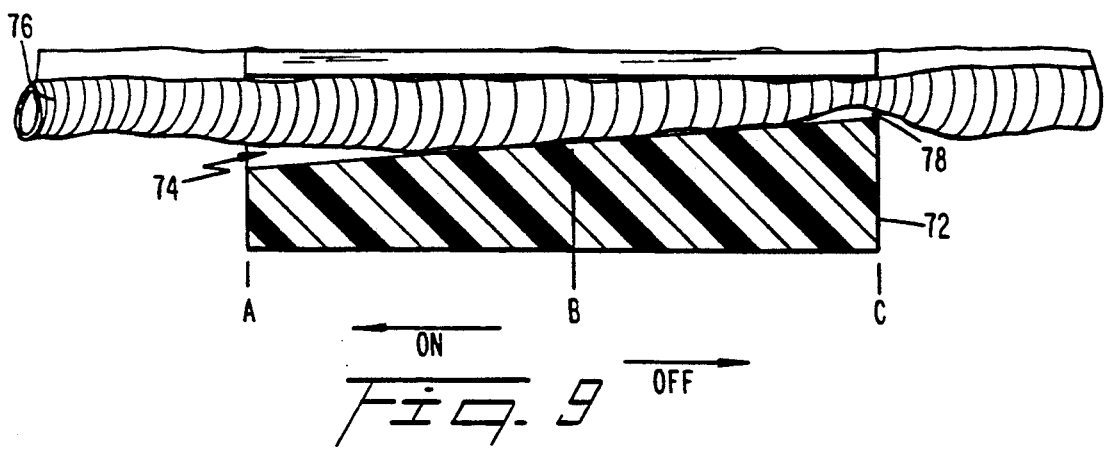

FIG. 9 is a fragmentary cross-sectional view illustrating the gripping of a bead with the embodiment of FIGS. 2 or 3.

Figure 10:
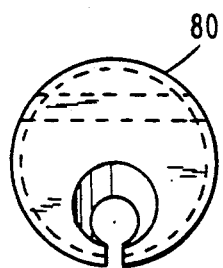

FIG. 10 is an end view of yet another embodiment of this invention.

Figure 10A:
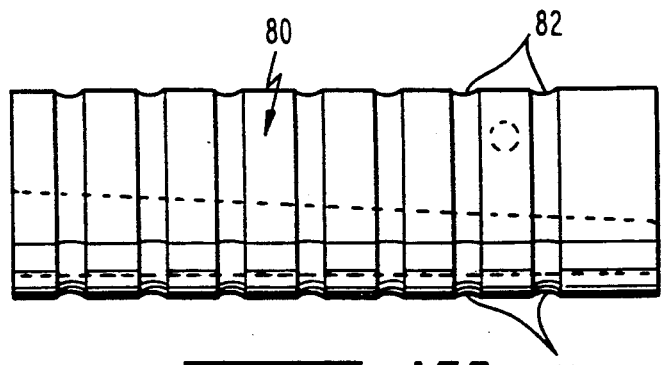

FIG. 10A is a side view of the device in FIG. 10.

Figure 11:
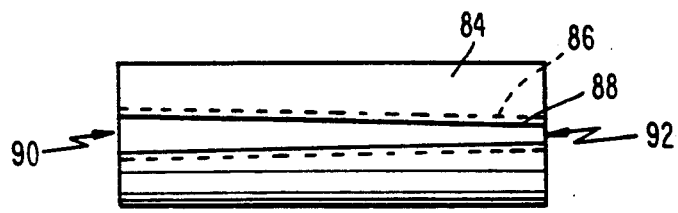

FIG. 11 is a side view of yet another alternative embodiment of this invention.

Figure 12:
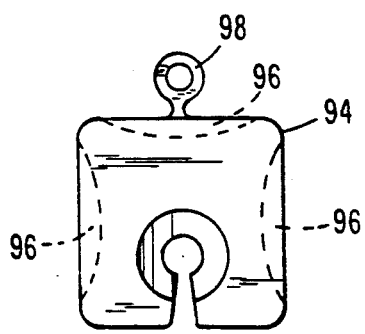

FIG. 12 is an end view of yet another alternative embodiment of this invention.

Figure 13:
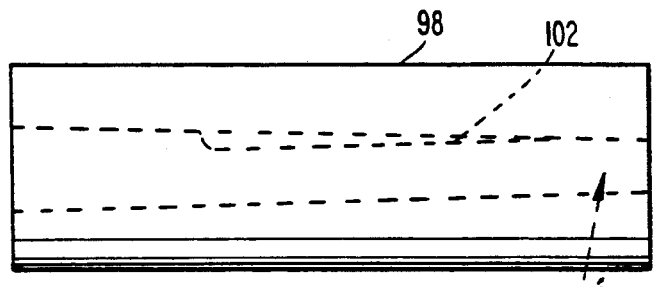

FIG. 13 is a side view of still another embodiment of this invention.

With attention to the drawings and to FIGS. 1 and 1A, the prior art device 10 includes a longitudinal slit 12 of uniform width through the entire length. Slit 12 opens into a cut out portion 14 which was cylindrical. Bevelled edges 16 and rounded ends 18 are provided to facilitate receiving a bead or the like within the cut out portion 16 through slit 12. The device then, when mounted on a bead is free to slide laterally in either direction.

In a preferred embodiment of this invention shown in FIGS. 2, 2A, 3 and 3A, there is also provided an elongated member 20 and 20'. Bevelled edges 22 and 22' are similarly provided. There is also a longitudinal clip 24 and 24' and an internal cut out portion 26. and 26'. In contrast to the cut out portion in the device of FIGS. 1 and 1A, the cut out portion 26 or 26' tapers from the large end 28 or 28' to the smaller end 30 or 30' so that the constriction at 30 or 30' will, as will be subsequently explained, positively engage the bead contained in cut out portion 26 or 26' against movement. As shown, the difference between FIGS. 2, 2A and 3, 3A is the diameter of the tapered cut out portion 26 or 26'. As will be obvious to those skilled in the art, various diameters will be necessary to accommodate different sized beads. For example, the device of FIG. 3 and 3A might be used to secure the bottom sheet to a mattress bead whereas the device of FIGS. 2 and 2A could be used to secure a blanket, top sheet and bottom sheet to the same mattress bead.

With reference to FIG. 4, the device of this invention may include an embodiment 34 wherein a hole 36 is provided for a fastening means 38. Fastening means 38 may be used for example to secure the device 34 to the bed frame. In this way, the device will not become lost when for example the sheets are being changed.

With reference to FIGS. 5 and 6, there are disclosed therein a wide variety of embodiments. For example as shown in FIG. 5A, the device of this invention need not cylindrical. As shown in FIG. 5B, the device of this invention also need not have a cylindrical cut-out portion.

With reference to FIGS. 6A, the cut-out portion may be provided off center. As shown in FIG. 5B the cut-out portion 40 can include an internal ridge 42 to facilitate a gripping action. As shown in FIG. 6C, the cut-out portion may be elliptical. As shown in FIG. 6D, the cut-out portion 44 may include a rounded ridge 46 in contrast to the ridge 42 shown in FIG. 6B. FIG. 6E illustrate an elliptical cut-out portion and FIG. 6F illustrates a similar elliptical cut-out portion. FIG. 6E is a cylindrical body whereas FIG. 6A has an elliptical cross-section.

With attention to FIG. 7 in this embodiment of this invention, the device 50 includes a tapered internal member 52 within cut-out portion 54. However, the taper to the constricted end 56 begins in the central area 58 rather than at the enlarged end 60. In this embodiment, the diameter of the end of 56 is one half that of end 60.

With reference to FIGS. 8 and 8A, in this embodiment the device 62 has a cut-out portion 64 which tapers from an enlarged end 66 to a constricted end 68. However, there is also provided therein a wedge member 70 to further facilitate gripping.

With reference to FIG. 9, FIG. 9 illustrates the gripping action of a preferred embodiment of the device of this invention similar to that shown in FIGS. 2, 2A, 3, and 3A. As shown, the device of this invention 72 has a tapered cut-out portion 70 which receives a bead 76. The constricted end 78 then grips the bead so that a positive engagement is provided against both forces directed perpendicular to the longitudinal axis, and lateral forces in the directed shown by the arrow "on". The device is then removed by backing it off in the direction of the arrow marked "off".

With reference to the embodiment of FIG. 10, the device of this invention 80 also may be provided with serrations 82 which extend around the exterior thereof to facilitate gripping.

With attention to FIG. 11, in this embodiment the device of this invention 84 has a tapered cut-out portion 86 as shown for example in FIGS. 2 or 3, but in addition, the slot 88 is also tapered from a widened slot at end 90 to a narrower slot at the constricted end 92.

With reference to FIG. 12, in that embodiment the device 94 is essentially square in cross-section with longitudinal portions 96 to facilitate gripping. In addition, an eye 98 is provided for a securing strap (not shown) similar to that used in FIG. 4.

Finally, in FIG. 13, there is provided in embodiment similar to FIG. 8A wherein the device 98 has a tapered cut-out portion 100 and an internal wedge member 102. Wedge member 102 however is disposed in the central portion of device 98 rather than at an end 66 as shown in FIG. 8A.

In summary, the device of this invention is intended to be constructed of a rigid material such as a plastic, metal, ceramic, wood, or the like. The preferred version is plastic and is injection molded. The device is intended to receive a bead for example from a mattress with a sheet thereover and secure the same by positively engaging at a constricted portion thereof said bead and overlying sheet or bed covering. Once the device has engaged the bead it will not move in response to forces directed perpendicular to its longitudinal axis and clearly, since the bead will be wedged into a constriction within the device, it will take some force in the lateral direction to dislodge it. The internal constriction may be merely a tapered cut out portion extending the length thereof, or a wedge member disposed therein, or a molded or integral ridge therein. The internal constriction may be further assisted by a tapering slot through which the bead is received within the device.

The invention may be embodied in other specific forms without departing from the spirit or essential characteristics thereto. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A device for securing a covering to an upholstered seam bead comprising:

a rigid; elongated member having a longitudinal slit opening into a longitudinal extending hollowed out portion opening at either end thereof; and means carried by said member integral therewith and formed within the hollowed out portion for wedging a bead portion against the internal walls thereof so that when a bead and covering are received within the hollowed out portion said device will grip said bead and covering in response to lateral movement thereof.

2. The device of claim 1 wherein said means comprises a wedge disposed within said hollowed out portion.

3. The device of claim 2 wherein said wedge is disposed adjacent an end thereof.

4. The device of claim 2 wherein said wedge is spaced away from either end thereof.

5. The device of claim 1 wherein said means comprises an internal taper so that one end of said hollowed out portion is smaller than the other.

6. The device of claim 5 wherein said hollowed out portion is circular in cross-section.

7. The device of claim 5 wherein said hollowed out portion is elliptical in cross-section.

8. The device of claim 5 wherein the slit narrows as it extends from the larger end to the smaller end.

9. The device of claim 1 wherein said bead is a mattress bead and said device is intended to secure a sheet thereto.

* * * * *